United States Patent [19]

Guilhem et al.

[11] 4,163,975

[45] Aug. 7, 1979

[54] METHOD OF MEASURING THE ALTITUDE OF A TARGET MANEUVERING AT A VERY LOW ELEVATION, AND A TRACKING RADAR USING SAME

[75] Inventors: Robert Guilhem; Maurice Rivron; Bruno Weulersse, all of Paris, France

[73] Assignee: Thomson-CSF, Paris, France

[21] Appl. No.: 866,774

[22] Filed: Jan. 3, 1978

[30] Foreign Application Priority Data

Jan. 7, 1977 [FR] France .................................. 77 00374

[51] Int. Cl.² ............................................... G01S 9/22
[52] U.S. Cl. ................................................. 343/16 M
[58] Field of Search ..................................... 343/16 M

[56] References Cited

U.S. PATENT DOCUMENTS

| | | |
|---|---|---|
| 3,757,326 | 9/1973 | White ........................... 343/16 M X |
| 3,794,998 | 2/1974 | Pearson, Jr. et al. .............. 343/16 M |
| 3,795,913 | 3/1974 | Kosowsky et al. ................ 343/16 M |
| 3,827,049 | 7/1974 | van Staaden et al. .......... 343/16 M X |
| 3,854,135 | 12/1974 | White ................................ 343/16 M |
| 4,005,421 | 1/1977 | Dax .................................... 343/16 M |
| 4,012,740 | 3/1977 | Lenneper ...................... 343/16 M X |
| 4,084,160 | 4/1978 | Leuenberger et al. ........... 343/16 M |

Primary Examiner—T. H. Tubbesing
Attorney, Agent, or Firm—Karl F. Ross

[57] ABSTRACT

A method of measuring the altitude of a target maneuvering at very low elevations is used to determine the instantaneous deviation of the target at various operating frequencies of a monopulse tracking radar. The quadrature component of the difference signal is evaluated at these frequencies, the mean values of the instantaneous deviation and of the quadrature component are determined for a certain number of frequency samples, and an extreme value of the mean value of the quadrature component is found to allow the corresponding mean value of deviation to be validated.

14 Claims, 7 Drawing Figures

METHOD OF MEASURING THE ALTITUDE OF A TARGET MANEUVERING AT A VERY LOW ELEVATION, AND A TRACKING RADAR USING SAME

FIELD OF THE INVENTION

The present invention relates to a method of measuring the altitude of a target maneuvering at a very low elevation, and to a tracking radar which employs this method.

BACKGROUND OF THE INVENTION

A target can be tracked by means of a radar of the monopulse type with great accuracy in the majority of cases where the altitude of the target is such that it allows the effects of the ground or the surface of the sea to be avoided.

However, when a target is maneuvering at very low elevation, for example less than the width of the lobe of the antenna, the antenna receives not only energy returned directly by the target but also energy which is returned by the target after reflection from the ground or the surface of the sea when the latter is smooth (specular reflection), and also the energy which is returned by the target after multiple reflections in cases where the sea is relatively rough (diffuse reflection).

In such cases, conventional processing of the sum and difference information which the radar supplies gives erroneous results. In fact, under favorable tracking conditions, in a monopulse radar the vector representing the difference signal is either in phase or in phase opposition with the vector representing the sum signal. When there is specular or diffuse reflection in the case of targets maneuvering at very low elevation, the presence of images of the target completely alters the signal received by the radar and the radar is then no longer capable of tracking properly.

Studies made of this problem have revealed that the angle formed by the sighting axis of the radar with the direction of the target, or the angular aiming error, which equals but for a proportionality factor the ratio between the values of the difference signal and the sum signal, is no longer a real quantity but a complex one. In other words, the difference signal which must be considered is no longer colinear with the sum signal but forms a certain angle with it. The result is that the difference signal contains a component colinear with the sum signal which forms its real part, and a perpendicular component which forms its imaginary part.

The same studies have also revealed that to obtain correct information on the elevation, i.e., altitude, of the target under these conditions it is necessary to take into account both these components, incorrect results being produced if altitude is assessed on the basis of the real component alone. A method of determining the altitude of a target maneuvering at low elevation using a monopulse radar has been described in an article entitled "Complex Indicated Angles Applied to Unresolved Radar Targets and Multipath" by S. M. Shermann which appeared on pages 160 to 170 of the publication IEEE Transactions on Aerospace and Electronics Systems, vol. AES 7, No 1 of January 1971.

In the case of a target where there is only a single image, it is conventionally assumed that the sum channel gives two values $S_A$ and $S_B$ corresponding to the echoes of the target A and its image B, respectively, and that the sum signal S is the resultant of signals $S_A$ and $S_B$, i.e., $S = S_A + S_B$, A and B being the angular aiming errors for the target and its image.

The resultant difference signal D is also the vector sum of the signals $D_A$ and $D_B$ which correspond respectively to the echoes of the target and its image on the elevation difference channel. Only elevation is considered since the determination of azimuth presents no problem in the case concerned. It can therefore also be said that $D = D_A + D_B = K(AS_A + BS_B)$, K being a proportionality factor, by analogy with the expression which for a conventionally operating monopulse radar, gives the angular aiming error for the target in relation to the sighting axis of the radar.

It can therefore be said that $$\frac{S_B}{S_A} = g \cdot r \cdot e^{j\phi}$$

where g is the ratio between the antenna gains in the direction of the echo of the target and in the direction of its image, r is the absolute value of the coefficient of reflection of the reflected wave, and p is the phase shift between the two echoes received by the radar. The value $1/K \cdot D/S$ then becomes a complex number $$\frac{A + Bg \cdot r \cdot e^{j\phi}}{1 + g \cdot r \cdot e^{j\phi}} \quad (1)$$

where A and B are the angular aiming errors defined above.

For an isolated target, the function (1) is real (g=o) and represents the angular aiming error A. In the case of a target accompanied by an image, this function is complex and is termed a complex angle.

If it is assumed that over a short period the quantities A and B are virtually constant, the product g.r is constant and if on the other hand the phase shift between the corresponding echoes from the target and its image varies to a sufficient degree, it can be shown that the end of the vector representing the function (1) describes a circle belonging to a family of circles which pass through the points formed by the ends of the real vectors having the values A and B. Thus, each value of the product g.r corresponds to one of the circles in the family. A second family of circles orthogonal to the first is obtained when g.r varies and $\phi$ remains constant, these circles passing through the points defined above.

The conventional method thus consists in determining the value of the product g.r and then, for the known value of g.r, correlating the change in the complex angle with curves which represent the possible changes over time in the values of angles A and B for a series of trajectories.

A more sophisticated method uses different frequencies or possibly times to determine three points on a circle which corresponds to a constant value of g.r. It thus becomes possible to calculate the value of the angle A. However, both these methods have a number of drawbacks. Firstly, there is still a certain amount of ambiguity due to the large number of possible intersections with the curve corresponding to each of the possible trajectories, which is generally a spiral. The number of intersections and thus of ambiguities rises sharply with the transmission frequency and the height of the radar above the sea. The result is that it is impossible to use such a method in the $K_u$ and $K_a$ bands, for example.

Secondly, these methods require the product g.r to be known with accuracy.

Broadly speaking, the methods described above are complex and the noise of the receiver has a disadvantageous influence on measurement errors. It has also been found that the accuracy of the measurements becomes very much worse in the presence of diffuse reflections, even of a relatively low level. In addition, the methods described above are valid only in the field where monopulse deviation measurement is linear, owing to the structure of the function (1) involved.

OBJECTS OF THE INVENTION

An object of the present invention is to provide a method of determining the altitude of a target maneuvering very low elevation which does not have the drawbacks set forth above.

A related object is to provide a tracking radar designed to implement our improved method.

SUMMARY OF THE INVENTION

In operating a monopulse tracking radar pursuant to the method of our invention, we derive sum and difference signals from incoming energy reflected by a target and received by an antenna as is well known per se, the vector of the difference signal including a certain angle with the sum signal and being therefore constituted by an in-phase component colinear with the sum signal and a quadrature component perpendicular thereto. After separation of these components from each other, we extract from the sum signal and from the in-phase component of the difference signal a deviation signal representative of an instantaneous angular aiming error, the instantaneous value of this deviation signal being separately measured for each of a multiplicity of sampling frequencies lying within the operating pass band of the radar; we also measure separately, for each of these sampling frequencies, the magnitude of the quadrature component. The measured instantaneous values of the deviation signal and of the quadrature component are then separately averaged, for the suppression of short-term fluctuations largely independent of frequency, with overlapping series of successive sampling frequencies to obtain respective mean values therefor; the mean value of the deviation signal is validated for a sampling frequency which corresponds to an extreme point of the curve formed from the mean values of the quadrature component, i.e., a point on which the slope of that curve is substantially zero.

A tracking radar according to our invention, serving to implement the above-described method, comprises first, second and third channels for respectively processing the sum signal, the difference signal and the quadrature component of the latter, the third channel being connected for this purpose in parallel with the second channel and including a $\pi/2$ phase shifter. A first demodulator with input connections to the first and second channels derives from the ratio of the difference and sum signals the aforementioned deviation signal while a second demodulator with input connections to the first and third channels delivers a signal voltage representing the quadrature component of the difference signal. The three channels are provided with mixer means receiving successive sampling frequencies from oscillator means advantageously including a frequency synthesizer. The first demodulator works into first filter means for smoothing short-term variations of the deviation signal to provide a frequency-dependent error signal while the second demodulator works into second filter means for smoothing short-term variations of the signal voltage representing the quadrature component to produce a resulting voltage varying the sampling or operating frequencies. An extreme value (as defined above) of this resulting voltage is detected by validating means connected to the second filter means, the validating means working along with the first filter means into an output circuit which passes the error signal upon the occurrence of that extreme value.

BRIEF DESCRIPTION OF THE DRAWING

Other objects, advantages and features of the invention will become apparent from the following detailed description of the invention considered in conjunction with the accompanying drawing in which.

SPECIFIC DESCRIPTION

In the foregoing we have discussed the difficulties which exist in determining the altitude of a target maneuvering at very low elevations, generally a height less than the width of the beam from an antenna of a monopulse radar. It was mentioned that in such cases the ground or the surface of the sea form mirrors which create an image of the target by reflecting the energy which is returned by the target when illuminated by the beam from the radar. It can be shown that under these conditions the amplitude and phase of the sum and difference vectors are very much disturbed and that the conventional processing of the signals which is performed in accordance with monopulse techniques no longer provides a correct estimate of the angular aiming error. For a tracking radar which is a monopulse radar this means that in elevation it is impossible to track properly a target maneuvering at very low elevation.

It was also mentioned that a solution to the problem of accurately determining an angle of elevation for a very low-flying target tracked by a monopulse radar had been proposed which relied on the concept of a so-called complex angular aiming error. This solution introduces into the elevation difference signal, which is no longer in phase or in phase opposition with the sum vector, the real component of this difference vector and its imaginary or quadrature component, which is perpendicular to the sum vector. However, the way in which these data are made use of still leaves room for certain ambiguities, which can be avoided by using the teaching of the present invention.

In the practice of the present invention we contemplate the utilization of a conventional monopulse radar with which deviation measurements are made in a known fashion. However, use is also made of the component on the difference channel which is in quadrature with the sum channel and which is termed the quadrature component of the difference.

In accordance with the invention, measurements of deviation are made in the frequency band in which the radar operates by considering the sum of the signals, as well as their difference, which are formed at the antenna output. In the deviation measurements we utilize that component of the difference which is in phase or in phase opposition with the sum. These deviation measurements are made for a large number of operating frequencies (referred to hereinafter as sampling frequencies) in the pass band. Broadly speaking, this wide frequency sweep is performed step by step so as to be compatible with a technique for eliminating fixed echoes or slow-speed interference (Moving-Target Indicator technique or MTI), or an equivalent technique. The signals processed by the monopulse radar are thus subjected beforehand to one of the well-known techniques for eliminating interference echoes due to retransmission from the surface of the sea. This means that for each frequency considered a number of pulses are transmitted and are processed with conventional elimination of fixed or interference echoes. Deviation measurements are made simultaneously at each of these sampling frequencies. In one example, with a radar passband of 4 GHz extending between 35 and 39 GHz, 160 measurements are made at frequencies 25 MHz apart.

Figure 1:
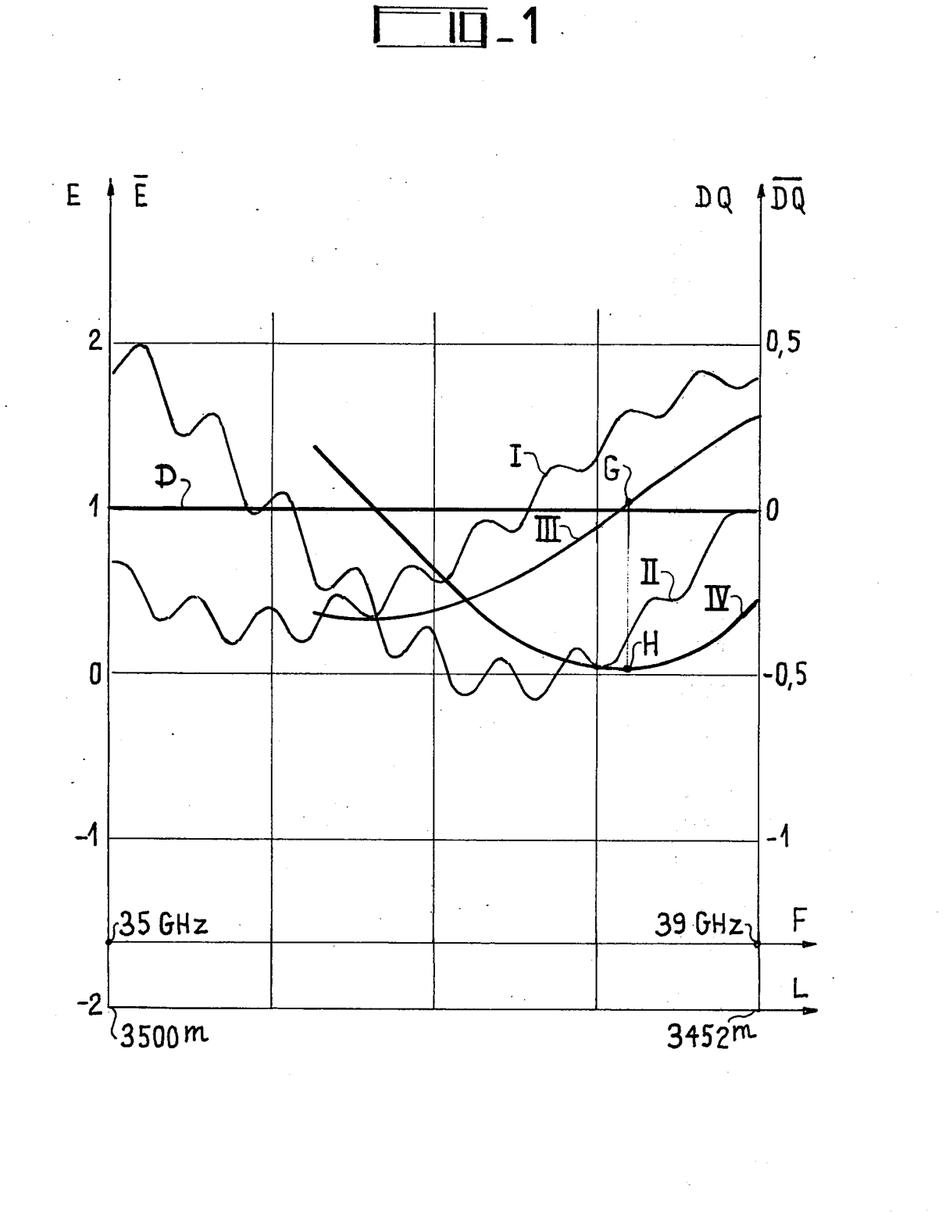
FIG. 1 is a series of curves relating to the change in the angular aiming error and in the quadrature component of the difference vector.

All the deviation measurements obtained at these various frequencies are plotted to give a curve which has the appearance of curve I in FIG. 1, in which the sampling frequencies F and the corresponding ranges L (in meters) appear along the abscissa and the values of the deviation-measurement voltage are registered along the ordinate. The shape of this curve, which thus represents the instantaneous deviation measured for a target maneuvering at very low elevation, is due to the fact that two effects are superimposed. There is a slow variation of large amplitude due to specular reflection, which is not greatly affected by frequency, and a variation which is of smaller amplitude in the example considered but of higher frequency and which is due to diffuse reflection, which is highly frequency-selective.

To reduce as far as possible the effect, in particular, of diffuse reflection, the procedure is to average the various measurements made in accordance with the invention. The averages are taken over a sufficient number of frequency samples to cancel out the effect of the fast variation due to diffuse reflection. The number of samples is, however, kept within limits so as not to cancel out the effect of specular reflection. We thus obtain what maybe termed a sliding mean which is given by the following expression for the mean value of the deviation measurements, i.e., $$\overline{E_i} = \frac{1}{N} \sum_{m=i-N+1}^{m=i} E_m \quad (1)$$

where N represents the number of frequency samples considered. Curve I then becomes curve III.

To produce a sliding mean, measurements taken on a series of N successive frequency samples are averaged whereby the mean of the measurements of deviation obtained at these N frequencies is formed. The mean of another, overlapping series of N deviation measurements obtained is then formed by shifting the set to which the mean applies by one unit, that is to say the first of the previous N frequencies is suppressed and replaced by the $(N+1)^{th}$. The same procedure continues until all the frequencies have been taken into account.

At the same time, in accordance with the invention, the value of the quadrature component of the difference is determined for all the frequencies selected. All the values so determined are plotted in curve II of FIG. 1, for which the ordinate scale is situated on the right (DQ).

The shape of this curve is due to the same effects as were mentioned above and to cancel these out as far as possible a mean is formed for the measurements under the same conditions as are described above. The mean of the quadrature component is given by the expression:

$$\overline{DQ_i} = \frac{1}{N} \sum_{m=i-N+1}^{m=i} DQ_m \quad (2)$$

Curve II thus becomes curve IV.

It can be seen that this curve passes through a point H where the slope of the curve is zero, representing an extreme value (here a minimum) of the averaged quadrature component. On curve III this point corresponds to a point G whose ordinate gives the exact value of the deviation angle of the target except for a very small residual error. Finding an extreme value for the mean values of the quadrature component of the difference amounts to integrating with the aid of a low-pass filter, the last 2p values obtained for this component. Integration over 2p sampling cycles yields an algebraic sum which is weighted for the first p values by a coefficient of $+1$ and the last p values by a coefficient of $-1$. The existence of an extreme value $V_e$ can therefore be found by means of the following expression:

$$V_j = \sum_{i=j-2p+1}^{i=j-p} DQ_i - \sum_{i=j-p+1}^{i=j} DQ_i \quad (3)$$

where $j \geq 2p$. The extreme value of $V_j$ is found when the product $V_{j+p} \times V_{j+p+1}$ changes in sign as indicated by a change in the polarity of voltage $V_j$.

Thus, in accordance with the invention, knowing that there is an extreme value for the mean of the quadrature component of the difference makes it possible to validate the corresponding mean deviation measurement.

In the example given, there is only one point validated. Under other conditions (target closer or higher) there could be a number of points of this nature. The method is still valid.

The foregoing was a simplified example, on the one hand of calculating the mean value $\overline{E_i}$ and on the other hand in determining an extreme value using weighting coefficients equal to $+1$ or $-1$. The determination in these cases may be improved by using different weighting laws, the symmetry of these laws preferably being even for calculating the mean and odd for determining the extreme value.

We shall now provide, by way of example, a vectorial proof of the validity of the method described, relating particularly to the fact that an extreme value of the variation of the quadrature vector of the difference validates the value which is obtained at this moment for the angular deviation of the target. For the purposes of the proof it is assumed that the illumination of the target is constant.

Figure 2:
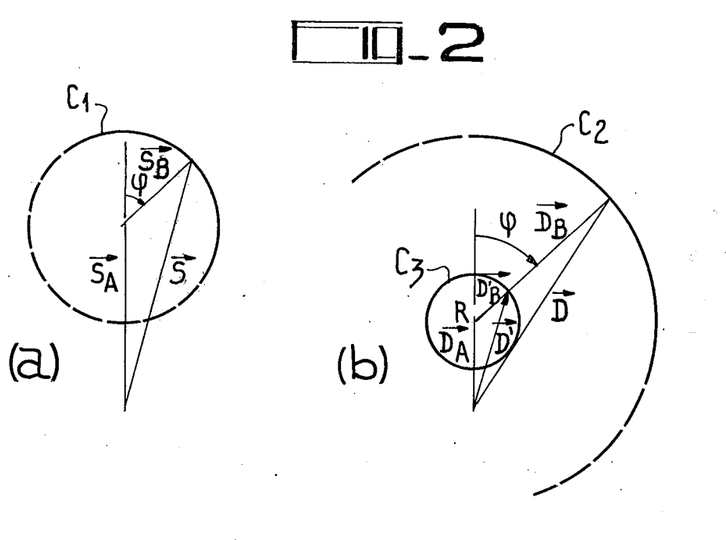
FIG. 2 is a geometrical representation of the sum and difference signals which are processed.

FIG. 2 relates to this proof.

In the case of conventional monopulse tracking, the deviation of the target is calculated from the value of the scalar product $\vec{D} \cdot \vec{S}$ calibrated by the square of the sum signal, i.e.

$$E = \frac{\vec{D} \cdot \vec{S}}{|S|^2}$$

In the case of a single target, $$E = \frac{D_A}{S_A},$$

the two vectors $\vec{D}_A$ and $\vec{S}_A$ being colinear. Remembering that the index A is used for the target proper and the index B for its image, in the case of a target accompanied by an image one obtains:

$$\vec{D} = \vec{D}_A + \vec{D}_B \text{ and } \vec{S} = \vec{S}_A + \vec{S}_B$$

In this case the loci of the ends of the vectors $\vec{S}$ and $\vec{D}$ are the circles $C_1$ and $C_2$, respectively, which are shown in graphs (a) and (b) of FIG. 2. A circle $C_3$ of center R will be assumed to be homothetic with circle $C_2$ in the ratio $$\frac{S_B}{S_A} \times \frac{D_A}{D_B};$$

vector $\vec{D}'_B$ is then supposed to be converted from vector $\vec{D}_B$ in accordance with this homothetic relationship.

The resulting difference vector $\vec{D}' = \vec{D}_A + \vec{D}'_B$ always remains colinear with the sum vector S in the course of the frequency sweep, that is to say when the angle 6 varies, since the triangles whose sides respectively are $S_A$, $S_B$, S and $D_A$, $D'_B$, $D'$ are homothetic.

The result is that the deviation $$E' = \frac{\vec{D}'\vec{S}}{|S|^2}$$

associated with $\vec{D}'$ assumes the correct value $$E = \frac{D_A}{S_A}.$$

To complete the proof it is merely necessary to find an angle $\phi$ such that the homothetic relationship laid down above has no effect on calculation of the measured deviation. This situation exists in the case of a vector $\vec{D}'_B$ orthogonal to the vector $\vec{D}'$ of the in-phase component. In effect, in this case the contribution of the echo of the image in the difference channel is zero since it is perpendicular to the sum channel. Since by construction $\vec{S}$ is colinear with $\vec{D}'$, $\vec{D}'_B$ being of constant modulus and perpendicular to the sum channel, the quadrature difference does in fact pass through an extreme value.

Figure 3:
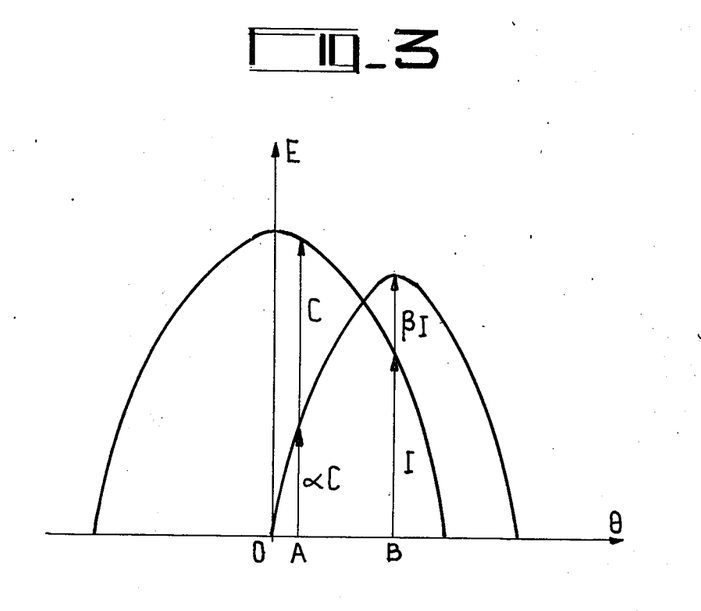
FIG. 3 is a representation of the echoes on the sum and difference channels as a function of the angular aim.

An analytical proof of the validity of the method according to the invention is also possible. Reference will be made to FIG. 3 which represents the echoes on the sum and difference channels.

Reference C represents the sum vector for the target with an angular aiming error A and reference I represents the sum vector for the image of the target with an angular aiming error B. The corresponding difference vectors are $\alpha C$ and $\beta I$ in the present case.

The components of the sum and difference vectors which are so defined in the complex plane are respectively $C + I \cos \phi$, $I \sin \phi$ and $\alpha C + \beta I \cos \phi$, $\beta I \sin \phi$, where $\phi$ is the angle of phase shift between the echo from the target and the echo from its image. The deviation E then becomes the scalar product.

$$E = \frac{\vec{S} \cdot \vec{D}}{|S|^2} = \frac{\alpha C^2 + CI(\beta + \alpha) \cos \phi + \beta I^2}{C^2 + I^2 + 2CI \cos \phi} \quad (4)$$

The quadrature difference DQ is expressed by the vectorial cross-product $$DQ = \frac{\vec{S} \times \vec{D}}{|S|^2} = \frac{CI(\beta - \alpha) \sin \phi}{C^2 + I^2 + 2CI \cos \phi} \cdot \frac{1}{2} \quad (5)$$

(the multiplier $\frac{1}{2}$ represents a weighting factor explained hereinafter with reference to FIG. 4).

This difference reaches an extreme value when $$\cos \phi = \frac{-C}{I} \text{ or } \cos \phi = \frac{-I}{C}.$$

The first case can be ruled out if the antenna is aimed above the level of the sea.

The second case, where $$\cos \phi = \frac{-I}{C},$$

yields upon substitution of this value in equation (4) the deviation of the considered target alone, i.e. $E = \alpha$. Thus, the deviation error obtained is zero if the measurement is validated when the quadrature difference is at its extreme value.

It will be noted from the two foregoing proofs that it is not necessary to assume, as is assumed in the conventional case, that the deviation-measurement voltages are linear as a function of the angular aiming error.

It may also be mentioned that in these two proofs it was assumed that the illumination of the target at transmission was constant. This will make it easier to understand the following description of the operation of the gain control for the quadrature difference channel.

In the foregoing we have described a method which enables the determination of the elevation, i.e., the altitude, of a target flying very low over the ground or the sea, by evaluating the instantaneous angular aiming error of the target at a plurality of frequency samples in the operating pass band of the monopulse radar employed, forming a mean for this error over a predetermined number of samples, and then validating this mean by determining an extreme of the mean value of the quadrature component of the difference signal which is obtained for the same samples.

An embodiment of a monopulse radar which employs the method according to the invention will now be described with reference to FIG. 4.

This radar has an antenna 1 connected to a high-frequency head 2 which is fed by a high-frequency amplifier 3. The latter is fed on the one hand by a frequency synthesizer 4 and on the other hand by a modulator 5. In addition to the various frequencies at which deviation measurements are made, this synthesizer also provides the local oscillation for the mixers described below. To the high-frequency head 2 are connected two chains or channels 6 and 7, one of which carries the sum information $\Sigma$ and the other the difference information $\Delta$ in conformity with monopulse techniques.

In the sum chain are the following circuits: a mixer 8 connected to an intermediate-frequency amplifier 10, which latter is followed by a range-selecting gate 17. The gate 17 feeds a demodulator 20 and then a filter 23 connected to an output circuit 27 which emits at 28 the validated deviation-measurement voltage.

The difference chain 7 comprises a mixer 9, an intermediate-frequency amplifier 11, and a range-selecting gate 18 connected to the demodulator 20. The circuits which follow, namely the filter 23 and the output circuit 27, are those mentioned in connection with the sum chain and are common to both chains.

The radar receiver contains a third chain for processing the quadrature component of the difference. This third chain comprises an intermediate-frequency amplifier 12 which is followed by a range-selecting gate 19, by a $\pi/2$ phase shifter 21, and by a demodulator 22. The demodulator has connected to it, in succession, a filter 24, an optimal analog/digital encoder 25, and a validating circuit 26 working into the output circuit 27. An automatic-gain-control circuit is associated with the receiver. It comprises an amplifier 16 which is connected on the one hand to a reference-voltage source 50 and on the other hand to a rectifying circuit 15 which is connected to the output of the range-selecting gate 17 in the sum channel in parallel with the input of the demodulator 20.

The amplifier 16 provides a voltage $V_s$ controlling the gain of the intermediate-frequency amplifiers 10 and 11 in the sum and difference channels, respectively. This voltage $V_s$ is also used to produce a voltage $V_p$ for controlling gain in the third chain which handles the quadrature component of the difference. The function of this voltage $V_p$ is to vary the gain in the quadrature-difference chain in such a way as to compensate as accurately as possible for the fast changes in the illumination of the target at transmission. The mean value of this control voltage, which is applied at a terminal P, is of no importance provided the amplifier 12 is not saturated, since the search for an extreme value given by the quadrature-difference channel does not depend on the scale factor set by that mean voltage.

Figure 7:
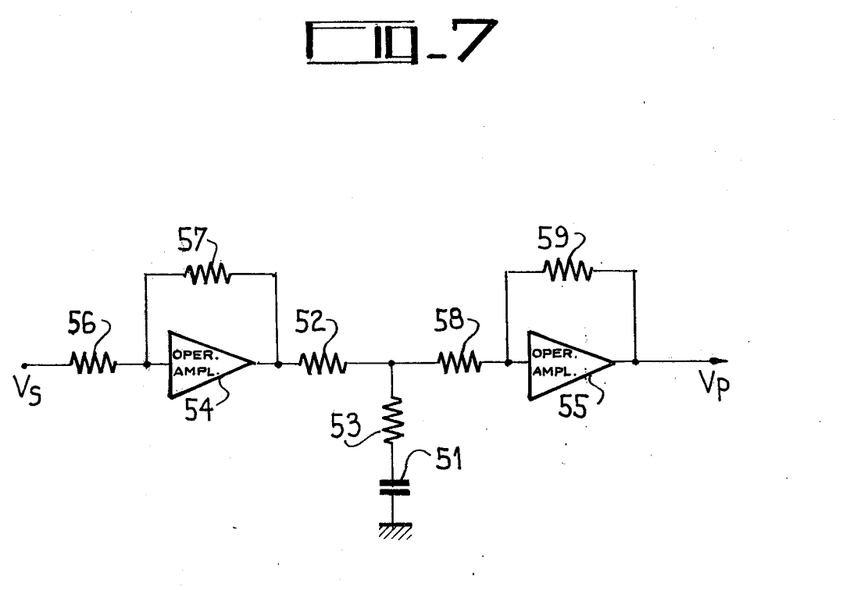
FIG. 7 shows a filter network for automatic gain control of a quadrature-difference channel included in the system of FIG. 4.

This control voltage is obtained from the voltage $V_s$ by a filtering network which is shown schematically in FIG. 7 and which establishes the following two conditions:

(1) that mean values taken over a very long time interval (several seconds) should be equal;

(2) that the fast changes in voltage $V_p$ should be equal to half the fast changes in voltage $V_s$.

In effect, since the sum channel is responsible for illuminating the target at transmission, the received signal in this same channel varies as the square of illumination of the target by reason of the inverse-square law. Since the characteristics of the intermediate-frequency amplifiers 10, 11 and 12 and logarithmic and theoretically identical, and since the fast changes in voltage $V_p$ are equal to half the fast changes in voltage $V_s$, the gain of amplifier 12 exactly compensates for the variation in the illumination of the target at transmission. The network of FIG. 7 comprises two operational amplifiers 54, 55 with input resistors 56, 58 and negative-feedback resistors 57, 59, respectively. A blocking capacitor 51 in the output of amplifier 54 acts as a short-circuit in case of fast changes in voltage $V_s$, which are halved by a voltage divider made up of two identical resistors 52 and 53 whose junction is connected to resistor 58. It is clear that the mean values of voltages $V_p$ and $V_s$ are identical but that the dynamic range of voltage $V_p$ is half that of voltage $V_s$. The operational amplifiers 54 and 55 are used solely for impedance matching and in principle have each a gain of $-1$.

Figure 4:
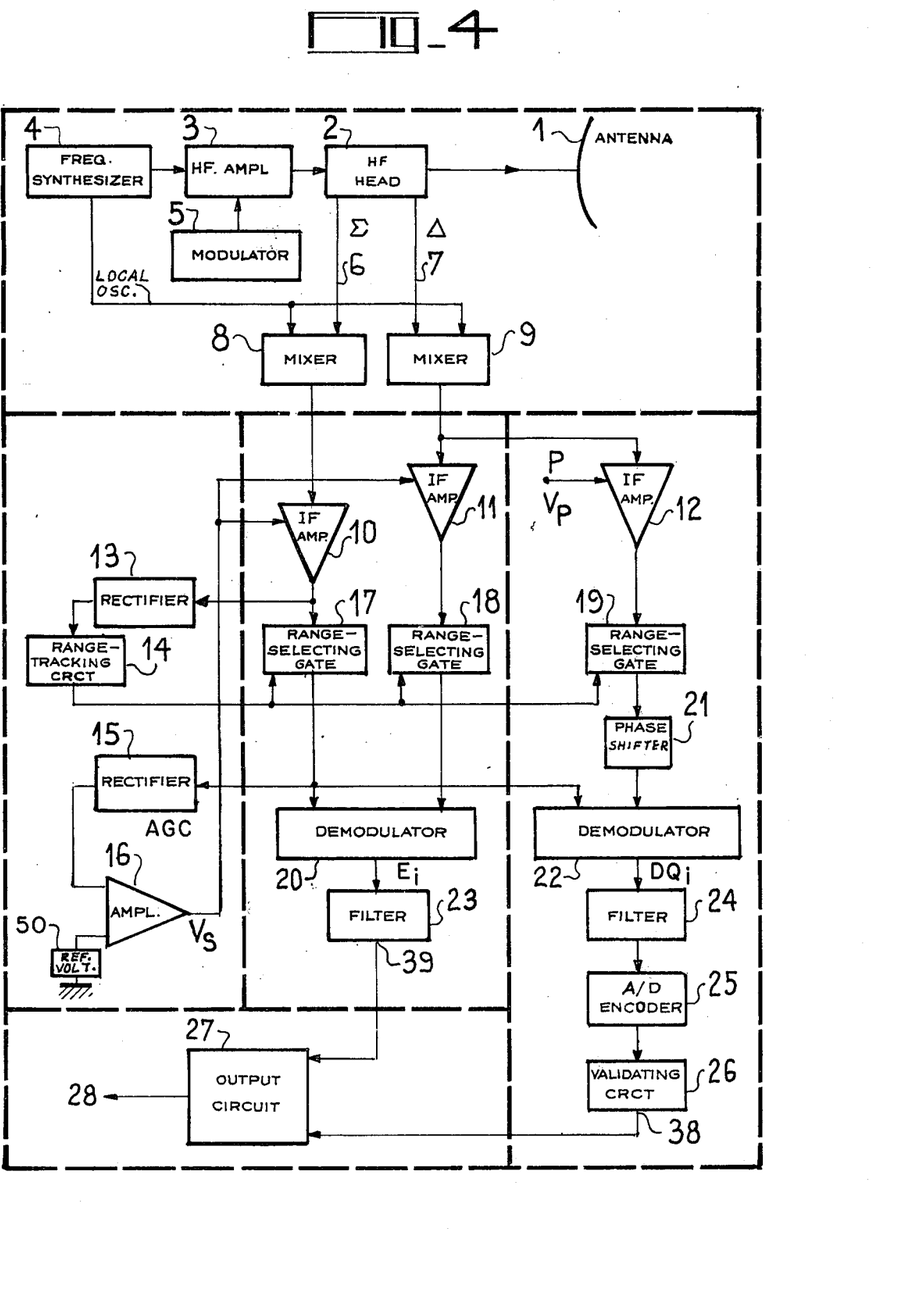
FIG. 4 is a schematic view of a tracking radar which uses the method according to our invention.

Also shown in FIG. 4 is the range-tracking circuit 14 of the radar receiver, which is connected via a rectifier 13 to the output of the intermediate-frequency amplifier 10 in the sum channel and whose output supplies the range-selecting gates 17, 18 and 19 contained respectively in the sum, difference and quadrature-difference chains. It may be noted that the latter chain is connected in parallel with the difference chain to the output of mixer 9.

The operation of such a radar receiver need not be described in detail since the deviation measurements which are performed at the various operating frequencies emitted by the synthesizer 4 do not differ from those performed in a conventional monopulse radar receiver which includes only the sum and difference chains 6 and 7. Similarly, the operations of the range-tracking chain and the automatic gain control are no different from those in a conventional monopulse receiver.

The quadrature-difference component is obtained from the output voltage of the mixer 9 which represents the difference signal. This output voltage, having been amplified in the intermediate-frequency amplifier 12 and range-isolated by the gate 19 controlled by the range-tracking circuit 14 has its phase shifted by $\pi/2$ in circuit 21. Alternatively, the $\pi/2$ phase shift may be performed before the range selection. The signal so obtained is demodulated in circuit 22 with reference to the sum signal from gate 17 and the demodulator emits a voltage DQ which represents the quadrature component of the difference.

The set of values DQ provided by the demodulator 22 is represented by curve II in FIG. 1. It will be recalled that the values of the deviation-measurement voltage E supplied by the demodulator 20 at the various operating frequencies of the radar concerned are represented by curve I by FIG. 1.

The filtering circuits 23 and 24 which are connected to the outputs of demodulators 20 and 22 respectively integrate the instantaneous voltage $E_i$ $DQ_i$ obtained from the measurements which are performed in each case at a predetermined number of sampling frequencies, with the result that at the outputs of these filters there are obtained the mean values $\overline{E_i}$ and $\overline{DQ_i}$. The mean voltage $\overline{E_i}$ is applied to circuit 27, which also receives the validating signal from circuit 26 supplied with the mean voltage $\overline{DQ_i}$ the filter 24 and, possibly, the analog/digital converter 25.

The purpose of the validating circuit 26 is to detect when the mean voltage $\overline{DQ_i}$ passes through an extreme. If there is such an extreme, a signal is transmitted to circuit 27, which thereupon emits on its output 38 a corresponding deviation signal which is the correct value for the target being tracked.

It may be mentioned that this description of a receiver with analog components is given as a non-limiting example and assumes that the transmission frequencies always follow one another in a monotonic succession of increasing or decreasing values so that the averages $\overline{E_i}$ and $\overline{DQ_i}$ can be formed without the need for classification. The use of digital processing at the outputs of demodulators 20 and 22, on the other hand, is highly suited to the transmission of random frequencies. In effect, it is easy to store and classify the information before forming these averages $\overline{E_i}$ and $\overline{DQ_i}$.

We shall now give further details of certain circuits which are employed in the system described with reference to FIG. 4.

Figure 5:
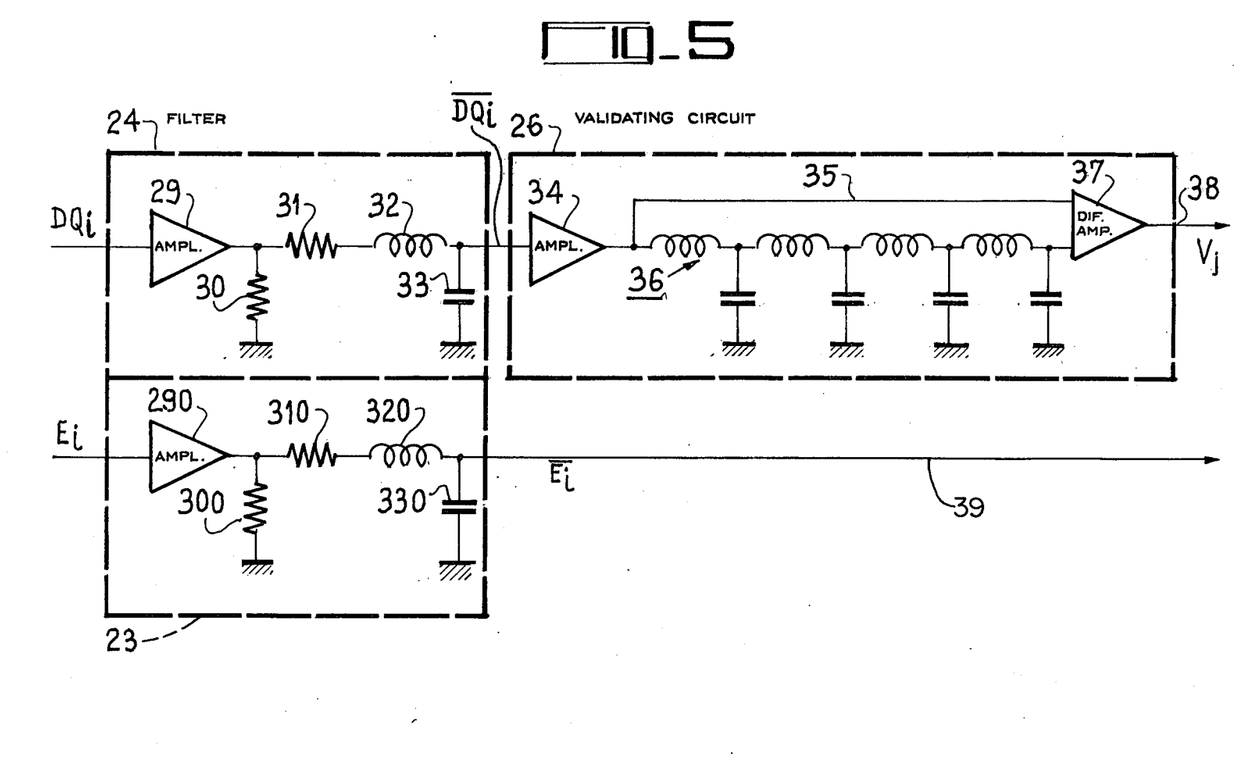
FIG. 5 is an embodiment of a filter and a validation circuit.

FIG. 5 is a schematic representation of the assembly consisting of a filter 24 and the so-called validating circuit 26.

The low-pass filters 23 and 24 are respectively formed by amplifiers 290, 29 working into grounded resistors 300, 30 and, in parallel therewith, into resistors 310, 31 in series with inductances 320, 32 and capacitors 330, 33, these capacitors respectively carrying the mean voltages $\overline{DQ_i}$ and $\overline{E_i}$ obtained by algebraically summing or integrating the instantaneous voltage samples $DQ_i$ and $E_i$.

The validating circuit 26, which is here shown connected directly to the circuit 24 with omission of the analog/digital encoder 25 of FIG. 4, comprises an amplifier 34 which is connected to respective inputs of a differential amplifier 37 by a direct line 35 and by a delay network 36 consisting of several series inductances and grounded shunt capacitors.

The circuit components 35-37 subtract the delayed and undelayed algebraic sums $\overline{DQ_i}$, coming from amplifier 34, from each other to produce the voltage $V_j$ of equation (3), these values being summed during two successive and equal intervals of time each encompassing p sampling cycles.

The resulting voltage $V_j$ which appears at the output 38 of the validating circuit 26, when applied to circuit 27, enables the validated deviation-measuring voltage or error signal to be obtained at the output 28 thereof.

Figure 6:
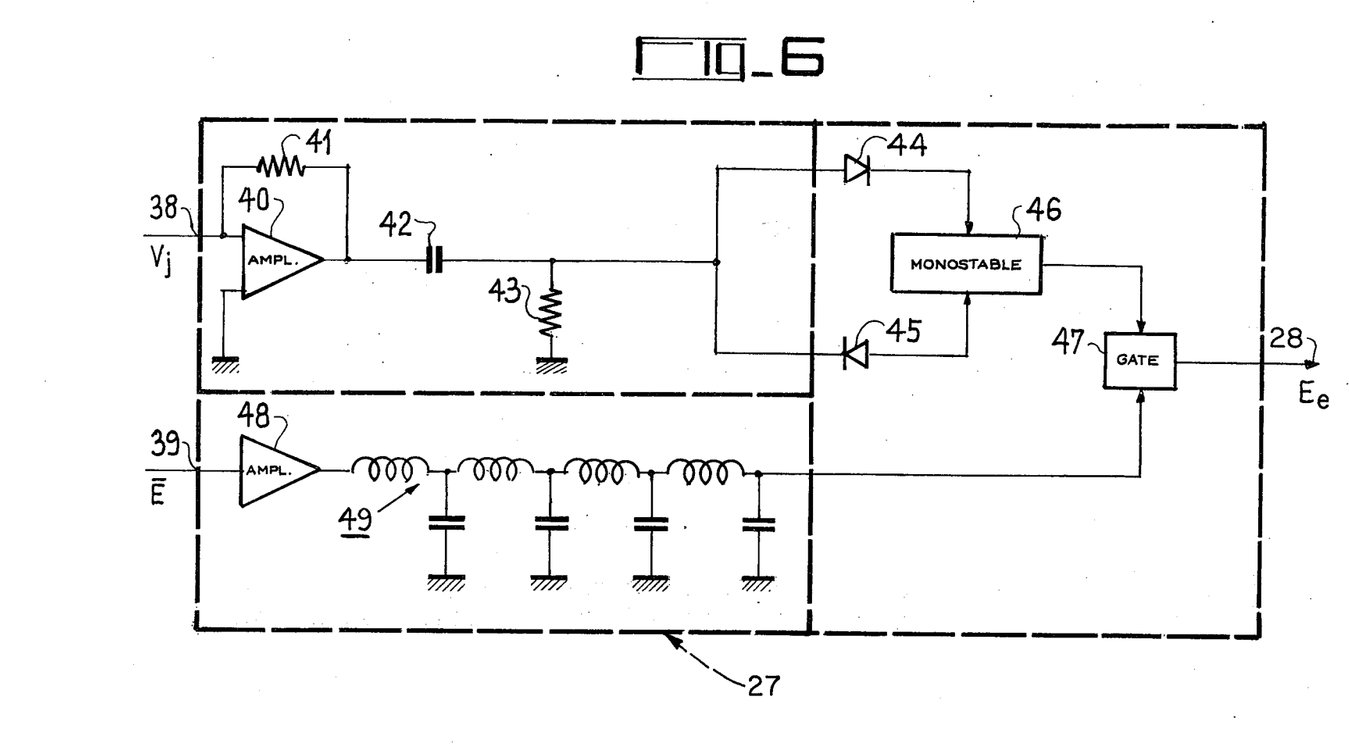
FIG. 6 is an embodiment of the output circuit of the system.

FIG. 6 is a schematic representation of the output circuit 27.

Starting from the input 38, which is the output of the validating circuit 26, circuit 27 comprises an amplifier 40 with a negative-feedback resistor 41 serving to shape the voltage $V_j$ representing the extreme value of the mean component of the quadrature difference. A differentiation circuit formed by a capacitor 42 and a resistor 43 is connected to the output of amplifier 40 and emits a positive or negative trigger pulse upon a change in the sign of the voltage $V_j$. The trigger pulses are applied, via one of two oppositely poled diodes 44, 45 as the case may be, to a monostable circuit or monoflop 46 whose output is connected to a normally blocked gate circuit 47.

Starting from a second input 39 which represents the output of filter 23, another branch of circuit 27 comprises an amplifier 48 followed by a delay network 49, similar to the network 36 of the validating circuit 26, whose output is applied to gate circuit 47. The latter, when a signal is present at both its inputs upon the triggering of monoflop 46, allows the validated deviation-measuring voltage $E_e$ to pass and appear on line 28.

The disclosed circuitry of our improved radar may be subjected to certain modifications without exceeding the scope of the invention. In particular, the method of producing the voltage for the measured deviation in elevation may be different and techniques making use of the phase difference between the vectors $\vec{S}+j\vec{D}$ and $\vec{S}-j\vec{D}$, for example, may be employed.

Similarly, certain above-described operating conditions may serve to ensure that the best results are obtained by the application of our method without being essential to the invention. Thus, in the context of the preferred embodiment herein disclosed, it is particularly advantageous to aim the antenna away from the target in the upward direction so as to reduce to a certain degree the effect of reflections from the sea. The fixed elevation from the antenna is then such that the intersection of the sum and difference channels is aimed 8 meters above the surface of the sea at the range of the target. This value of 8 meters, which is selected in the present case to show the variations in the deviation voltage and the quadrature difference, is given by way of example. Vertical misaiming by similar amounts may give results of the same order.

In FIG. 1 we have shown a straight line D which represents the theoretical deviation of the target when it is assumed that the echoes from specular and diffuse reflections are suppressed; this deviation is virtually constant in the course of the maneuvering of the target. We have found that the point G representing the deviation determined according to the invention is very close to the corresponding theoretical deviation.

We claim:

1. A method of operating a monopulse tracking radar with a given pass band for measuring the altitude of a target maneuvering at a very low elevation by determining the angular aiming error existing between the direction of the target and the aiming axis of said radar, comprising the following steps:

deriving sum and difference signals from incoming energy reflected by a target and received by an antenna of the radar with the vector representing the sum signal;

separating an in-phase component of said difference signal colinear with the sum signal from a quadrature component thereof perpendicular to said sum signal;

successively generating a multiplicity of sampling frequencies within said pass band;

measuring said quadrature component and a deviation signal representative of an instantaneous angular aiming error, extracted from said sum signal and said in-phase component, for each of said sampling frequencies;

averaging said deviation signal and said quadrature components measured with overlapping series of successive sampling frequencies to obtain respective mean values therefor;

detecting an extreme point of substantially zero slope on a curve formed from said quadrature component; and validating the mean value of said deviation signal for a sampling frequency corresponding to said extreme point.

2. A method as defined in claim 1 wherein measured voltages representing said deviation signal and said quadrature component are averaged in each of said overlapping series over a number N of successive sampling frequencies, less than the total number of sampling frequencies in said pass band, said mean values being respectively represented by $$\overline{E_i} = \frac{1}{N} \sum_{m=i-N+1}^{m=i} E_m \text{ and } \overline{DQ} = \frac{1}{N} \sum_{m=i-N+1}^{m=i} DQ_m$$

wherein $\overline{E_i}$, $E_m$, $\overline{DQ_i}$, $DQ_m$ are, respectively, the mean value of the voltage representing said deviation signal, the instantaneous value of a voltage representing said deviation signal at a frequency m, the mean value of the voltage representing said quadrature component, and the instantaneous value of the voltage representing said quadrature component at the frequency m.

3. A method as defined in claim 2 wherein the values representing the mean deviation signal $\overline{E_i}$ and the mean quadrature component $\overline{DQ_i}$ are derived from differently weighted voltages representing the instantaneous values of the voltages and, respectively.

4. A method as defined in claim 2 wherein the detection of said extreme point includes the steps of algebraically summing the last 2p instantaneous values of voltages obtained from successive measurements of said quadrature component, weighting the algebraic sums of the last p instantaneous values and of the immediately preceding p instantaneous values with coefficients of opposite sign, and monitoring a change in sign of the difference between said algebraic sums.

5. A method as defined in claim 4 wherein said weighting coefficients are $+1$ and $-1$.

6. A method as defined in claim 1 wherein said quadrature component is obtained by shifting by $\pi/2$ the phase of said difference signal and by demodulating the phase-shifted difference signal with respect to the vector of said sum signa.

7. A tracking radar of monopulse type for acertaining the altitude of a target, maneuvering at very low elevation, by processing reflected energy constituting a sum signal and a difference signal, said difference signal having an in-phase component colinear with said sum signal and a quadrature component perpendicular to said sum signal, comprising:

a first and a second channel for respectively processing said sum signal and said difference signal;

a third channel in parallel with said second channel including a $\pi/2$ phase shifter for processing the quadrature component of said difference signal;

a first demodulator with input connections to said first and second channels for deriving from the ratio of said difference and sum signals a deviation signal proportional to an angular aiming error between the direction of said target and an aiming axis of the radar at an operating frequency thereof;

a second demodulator with input connections to said first and third channels for delivering a signal voltage representing said quadrature component;

oscillator means for successively generating a multiplicity of different operating frequencies within a predetermined pass band, said channels being provided with mixer means connected to said oscillator means;

first filter means connected to said first demodulator for smoothing short-term variations of said deviation signal to provide a frequency-dependent error signal;

second filter means connected to said second demodulator for smoothing short-term variations of said signal voltage, thereby producing a resulting voltage varying with said operating frequencies;

validating means connected to said second filter means for detecting an extreme value of said resulting voltage; and output means connected to said first filter means and to said validating means for passing said error signal upon the occurrence of said extreme value.

8. A tracking radar as defined in claim 7 wherein said first filter means comprises an integrating network including a series inductance and a shunt capacitance.

9. A tracking radar as defined in claim 7 wherein said validating means comprises a differential amplifier with two inputs respectively connected to said first filter means by a direct path and by a delay line.

10. A tracking radar as defined in claim 7 wherein said oscillator means comprises a frequency synthesizer.

11. A tracking radar as defined in claim 7 wherein said output means comprises a differentiation circuit connected to said validating means for producing a trigger pulse derived from said resulting voltage upon a change in the polarity of said resulting voltage, a delay network connected to said first filter means, and a normally blocked gate in series with said delay network controlled by said trigger pulse for conducting upon a triggering of the latter.

12. A tracking radar as defined in claim 11 wherein said output means further comprises a monostable circuit connected to said differentiation circuit for actuation by said trigger pulse, said gate having a control input connected to said monostable circuit.

13. A tracking radar as defined in claim 7 wherein said first, second and third channels include respective first, second and third intermediate-frequency amplifiers downstream of said mixer means, further comprising automatic-gain-control means connected in parallel with said first and second demodulators to said first channel for generating a first control voltage for said first and second intermediate-frequency amplifiers and a second control voltage of half the dynamic range of said first control voltage for said third intermediate-frequency amplifier.

14. A tracking radar as defined in claim 13 wherein said automatic-gain-control means includes a first operational amplifier receiving said first control voltage, a voltage divider in series with a blocking capacitor in an output of said first operational amplifier, and a second operational amplifier having an input connected to a tap of said voltage divider for producing said second control voltage.

* * * * *